(12) United States Patent
Choi et al.

(10) Patent No.: US 9,671,003 B2
(45) Date of Patent: Jun. 6, 2017

(54) APPARATUS HAVING MULTI-OUTPUT DIFFERENTIAL GEAR

(71) Applicant: Research & Business Foundation SUNGKYUNKWAN UNIVERSITY, Suwon-si (KR)

(72) Inventors: Hyouk Ryeol Choi, Gunpo-si (KR); Jung Seok Suh, Suwon-si (KR); Homoon Kim, Bucheon-si (KR); Yun Seok Choi, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 13/920,898

(22) Filed: Jun. 18, 2013

(65) Prior Publication Data

US 2013/0337962 A1    Dec. 19, 2013

(30) Foreign Application Priority Data

Jun. 18, 2012    (KR) ........................ 10-2012-0064925

(51) Int. Cl.
*F16H 48/05*    (2012.01)
(52) U.S. Cl.
CPC .................. *F16H 48/05* (2013.01)

(58) Field of Classification Search
USPC ........................................... 475/221
See application file for complete search history.

(56) References Cited

U.S. PATENT DOCUMENTS

| | | | |
|---|---|---|---|
| 4,722,246 A | 2/1988 | Gaus | |
| 4,729,259 A * | 3/1988 | Lanzer | B60K 17/3465 180/248 |
| 6,561,945 B2 * | 5/2003 | Shattuck | F16H 57/082 29/893 |
| 7,083,541 B2 * | 8/2006 | Pecnik et al. | 475/221 |
| 2004/0124727 A1* | 7/2004 | Lau | H02K 7/116 310/83 |
| 2011/0045931 A1* | 2/2011 | Raghavan | B60K 6/365 475/221 |
| 2012/0088625 A1* | 4/2012 | Phillips | F16H 3/663 475/275 |
| 2012/0088627 A1* | 4/2012 | Phillips | F16H 3/66 475/275 |

FOREIGN PATENT DOCUMENTS

JP    62-167958 A    7/1987

* cited by examiner

*Primary Examiner* — Erin D Bishop
(74) *Attorney, Agent, or Firm* — NSIP Law (57) ABSTRACT

A multi-output differential gear apparatus includes a first differential gear having a first output gear and a middle gear, and second differential gear having a second output gear and a third output gear.

11 Claims, 10 Drawing Sheets

APPARATUS HAVING MULTI-OUTPUT DIFFERENTIAL GEAR

CROSS-REFERENCE TO RELATED APPLICATIONS

This application claims the benefit of priority under 35 U.S.C. §119(a) of Korean Patent Application No. 10-2012-0064925, filed on Jun. 18, 2012, in the Korean Intellectual Property Office, the entire disclosure of which is incorporated herein by reference for all purposes.

BACKGROUND

1. Field

The following description relates to a multi-output differential gear apparatus, for example, to a multi-output differential gear apparatus which may provide three or more outputs through one input.

2. Description of Related Art

A differential gear apparatus is a gear apparatus having three or more gears that interlock and engage one another, and that when two of those gears are rotated, the remaining gear is also rotated.

In various industrial fields of wheeled equipments such as industrial machines, speed reducers, speed increasers, winches, elevators, escalators, and automobiles, various types of differential gear apparatuses are in use that change the speed of input rev counts of the main driving force through a gear ratio suitable to various applications and transmit the changed output rev count to the driving means of a driving axis.

Particularly of the aforementioned, speed increasers or speed reducers are widely used which use rotation ratios of each rotary part of epicyclic gear units that transfer a big driving force with a simple structure. In particular, various types of gear apparatuses are being developed where numerous epicyclic gear units, that is, two or three epicyclic gear units are combined in series in order to obtain high efficiency.

That is, a differential gear apparatus using epicyclic gear units consisting of a sun gear in the middle and an internal gear in an outer circumference thereof, and epicyclic gears between the sun gear and the internal gear and epicycle gear carriers connecting the epicyclic gears uses two of the three elements of the sun gear, internal gear, and epicyclic gears as an input/output axis, and connects or fixates a separate driving force control apparatus to the remaining element to change the rotating force of the output rotation axis.

However, general differential gear apparatuses using such epicyclic gear units provide only two outputs in opposite directions from each other, and thus there is a problem that three or more outputs cannot be obtained when using conventional differential gear apparatuses.

Therefore, the purpose of the present disclosure is to resolve the problems of prior art aforementioned by providing a multi-output differential gear apparatus capable of generating a plurality of outputs through a plurality of differential gear parts with one driving force received from outside.

SUMMARY

In one general aspect, there is provided a multi-output differential gear apparatus comprising a first differential gear having a first output gear which receives external driving force and generates a first output having a different rotary speed from the external driving force when an external resistance is received, and a middle gear which interlocks and drives with the first output gear to generate a middle output; and a second differential gear having a second output gear which receives the middle output from the first differential gear and generates a second output having a different rotary speed from the middle output when an external resistance is received, and a third output gear which interlocks and drives with the second output gear to generate a third output having a different rotary speed from the second output.

In the general aspect of the multi-output differential gear apparatus, the first differential gear may have saw teeth in its inner circumference, the middle gear may be provided inside of and distanced from the first output gear, and the first differential gear may further comprise a plurality of epicyclic gears simultaneously engaging an inner circumference of the first output gear and an outer circumference of the connection gear.

In the general aspect of the multi-output differential gear apparatus, three first epicyclic gears may be arranged at equal angles around a central axis of the first differential gear.

In the general aspect of the multi-output differential gear apparatus, the first differential gear may further comprise a first upper cover having a first fixed axle on a surface facing the first output gear so that the first epicyclic gears may be inserted and may rotate individually; and a first lower cover extended from the second differential gear and having a first penetration groove in its central portion that may be penetrated by a bond axle which bonds with the middle gear, and having a first insertion groove on a surface facing the first upper cover so that the first fixed axle may be inserted.

In the general aspect of the multi-output differential gear apparatus, the first differential gear may further comprise a first upper cover having a first protrusion on a surface facing the first output gear so that the first epicyclic gears may be inserted and may rotate individually; and a first lower cover extended from the second differential gear and having a first penetration groove in its central portion that may be penetrated by a bond axle which bonds with the middle gear, and having a second protrusion on a surface facing the first upper cover to correspond to the first protrusion.

In the general aspect of the multi-output differential gear apparatus, the second output gear and third output gear may have saw teeth in their inner circumferences, and the second differential gear may further comprise a plurality of second epicyclic gears engaging an inner circumference of the second output gear and interlocking and rotating with the second output gear; and third epicyclic gears simultaneously engaging inner circumferences of the second epicyclic gears and third output gears and interlocking and rotating with the second epicyclic gears and third output gears.

In the general aspect of the multi-output differential gear apparatus, three second epicyclic gears may be arranged at equal angles around a central axis of the second differential gear, and three third epicyclic gears may be arranged at equal angles around a central axis of the second differential gear.

In the general aspect of the multi-output differential gear apparatus, the second differential gear may further comprise a second upper cover which receives a middle output from the middle gear provided between the second output gear and first differential gear, and having a second fixed axis on a surface facing the second output gear so that the second epicyclic gears and third epicyclic gears may be inserted and may rotate individually; and a second lower cover having a second insertion groove on a surface facing the second upper cover so that the second fixed axis may be inserted.

In the general aspect of the multi-output differential gear apparatus, the second differential gear may further comprise a second upper cover which receives a middle output from the first differential gear provided between the second output gear and first differential gear, and having a third protrusion so that the second epicyclic gears and third epicyclic gears may be inserted and may rotate individually; and a second lower cover having a fourth protrusion on a surface facing the second upper cover to correspond to the third protrusion.

In the general aspect of the multi-output differential gear apparatus, the second differential gear may further comprise a panel bearing between the second internal gear and third internal gear to prevent the second output gear and third output gear from contacting each other and thus being worn out.

In the general aspect of the multi-output differential gear apparatus, the first output gear, second output gear or third output gear may have saw teeth in their external circumference.

In the general aspect of the multi-output differential gear apparatus, the first differential gear may have a plurality of output gears, and the output gears may generate a plurality of outputs having different rotary speeds from the external driving force, when an external resistance is received.

According to the present disclosure, there is provided a multi-output differential gear apparatus which may generate three outputs through three output gears from one driving force received from outside.

In addition, through a panel bearing, it is possible to prevent the second output gear and third output gear from being worn out due to their contacting each other during rotation.

Furthermore, by having a plurality of output gears in the first differential gear, it is possible to generate three or more outputs.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
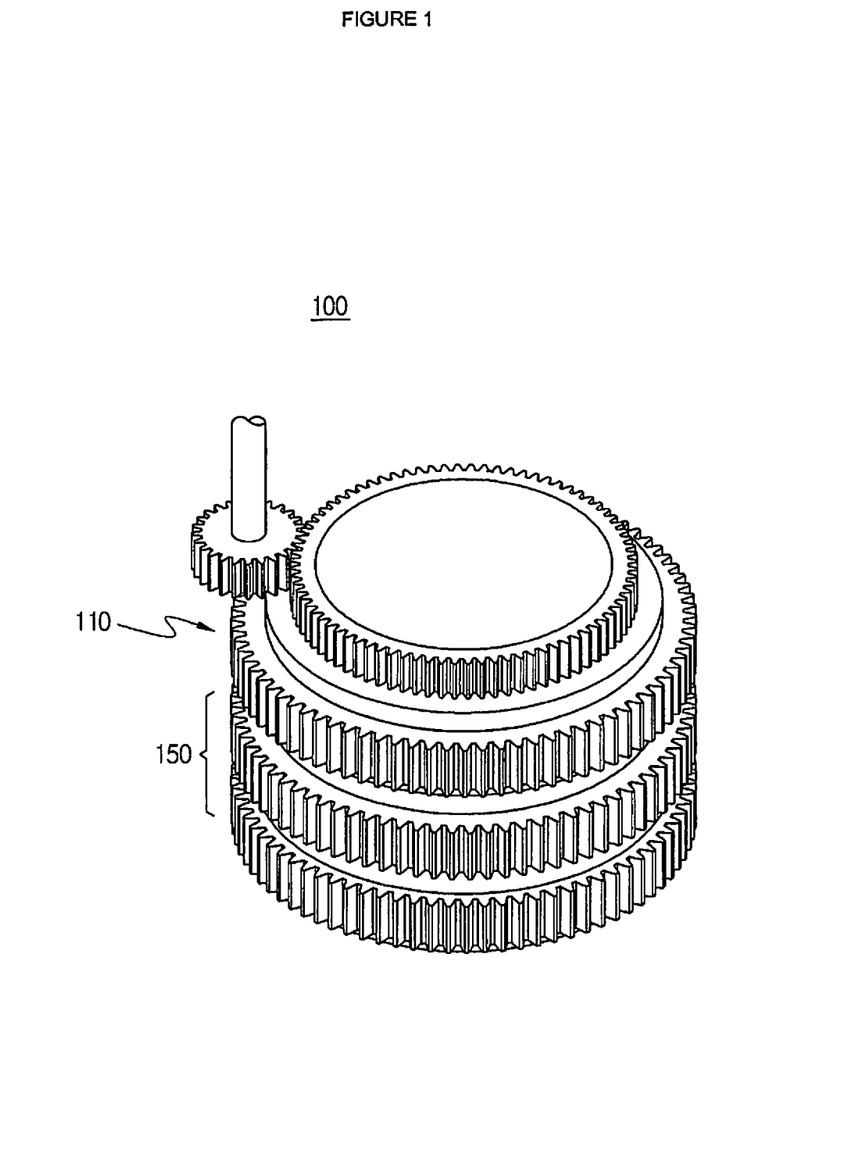
FIG. 1 is a perspective view roughly illustrating a multi-output differential gear apparatus according to a first exemplary embodiment of the present disclosure.
Figure 2:
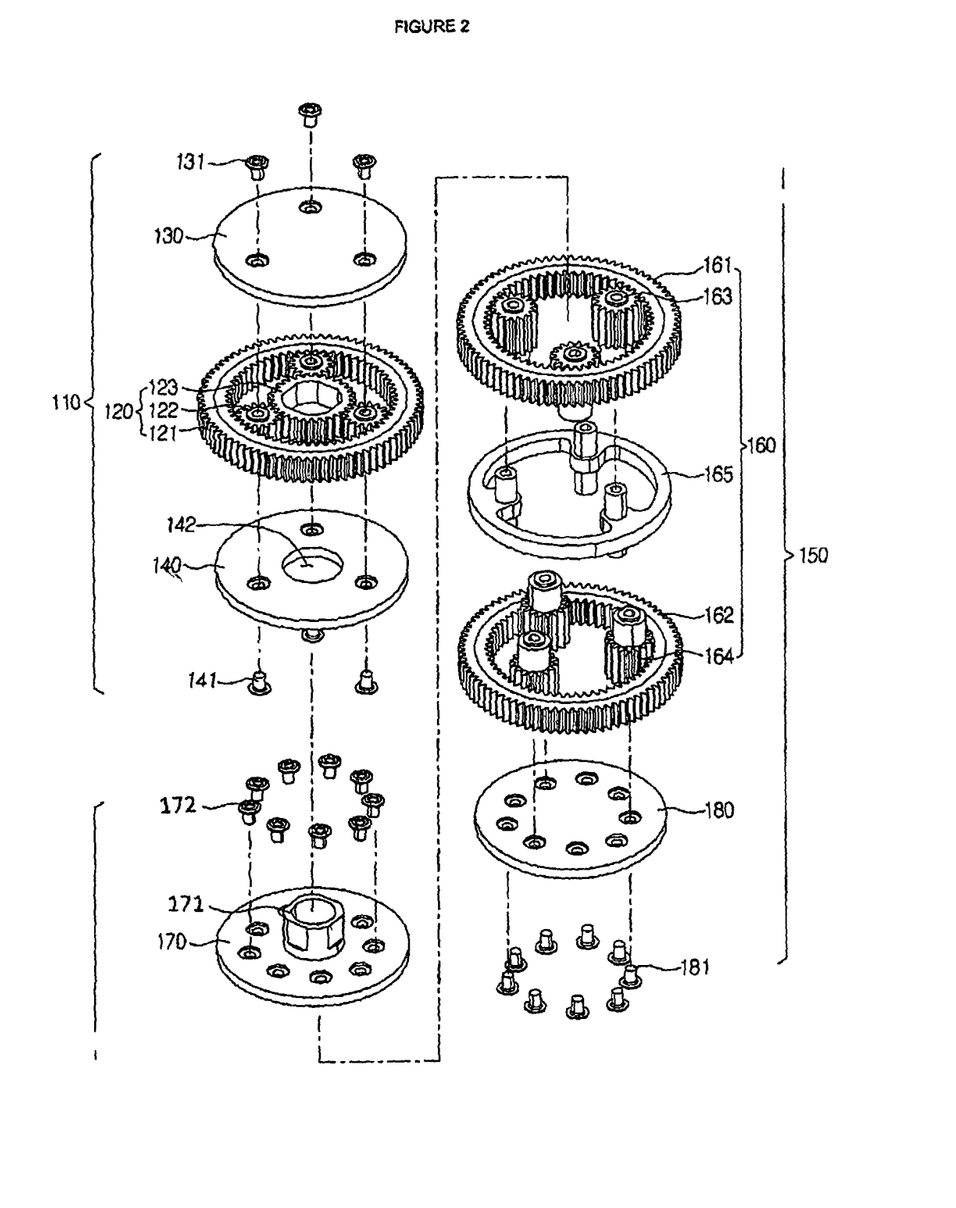
FIG. 2 is an exploded perspective view roughly illustrating a multi-output differential gear apparatus of FIG. 1.
Figure 3:
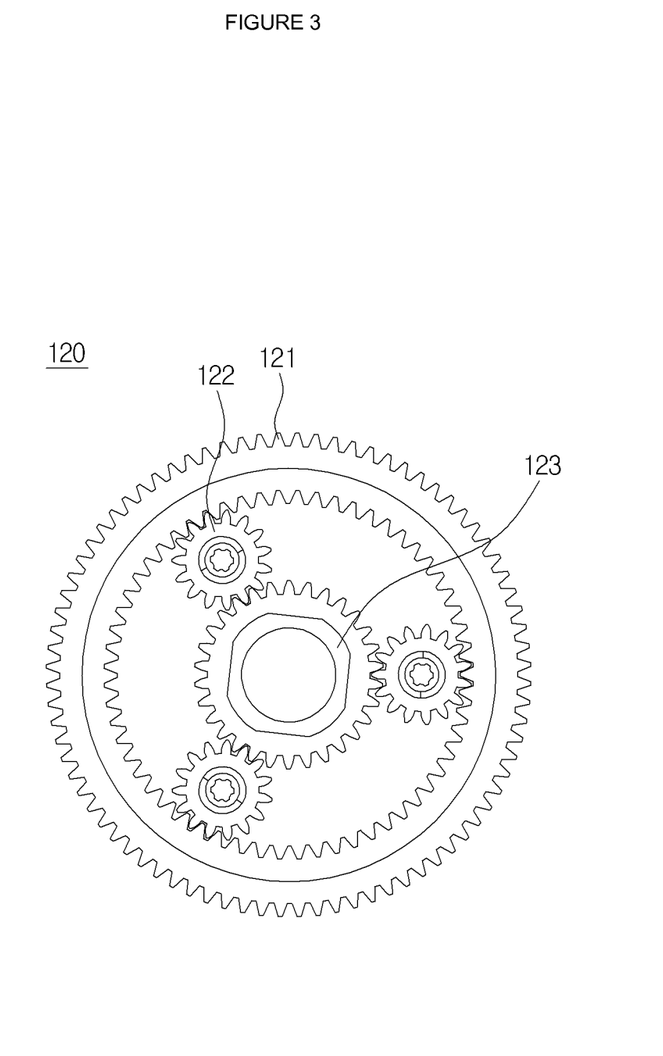
FIG. 3 is a front view roughly illustrating a first differential gear in a multi-output differential gear apparatus of FIG. 1.
Figure 4A:
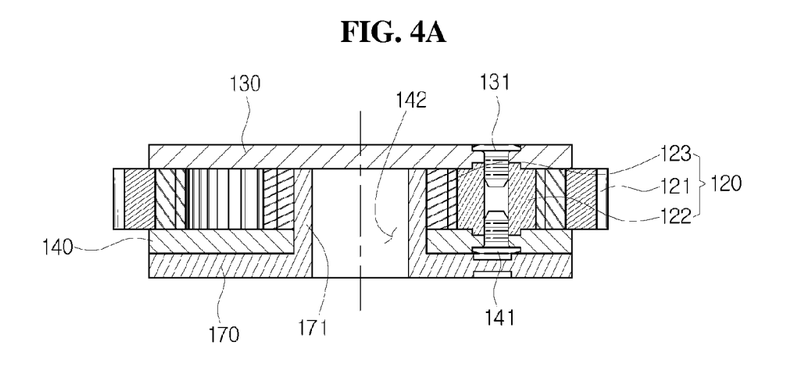
FIG. 4A is a cross-sectional view illustrating how a guidance of a first differential gear combines with an epicyclic gear in accordance with an example of a multi-output differential gear apparatus of FIG. 1.
Figure 4B:
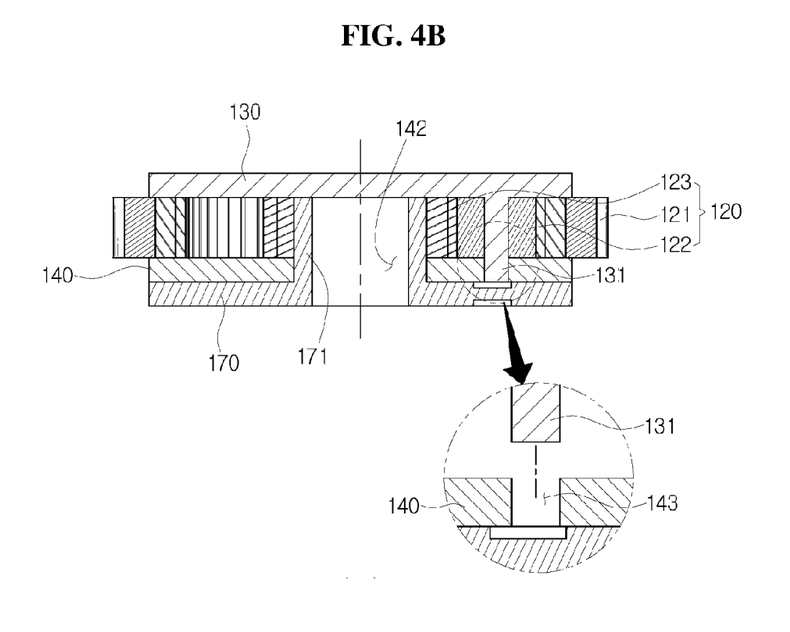
FIGS. 4B is a cross-sectional view illustrating how a guidance of a first differential gear combines with a epicyclic gear in accordance with another example of a multi-output differential gear apparatus of FIG. 1.
Figure 5:
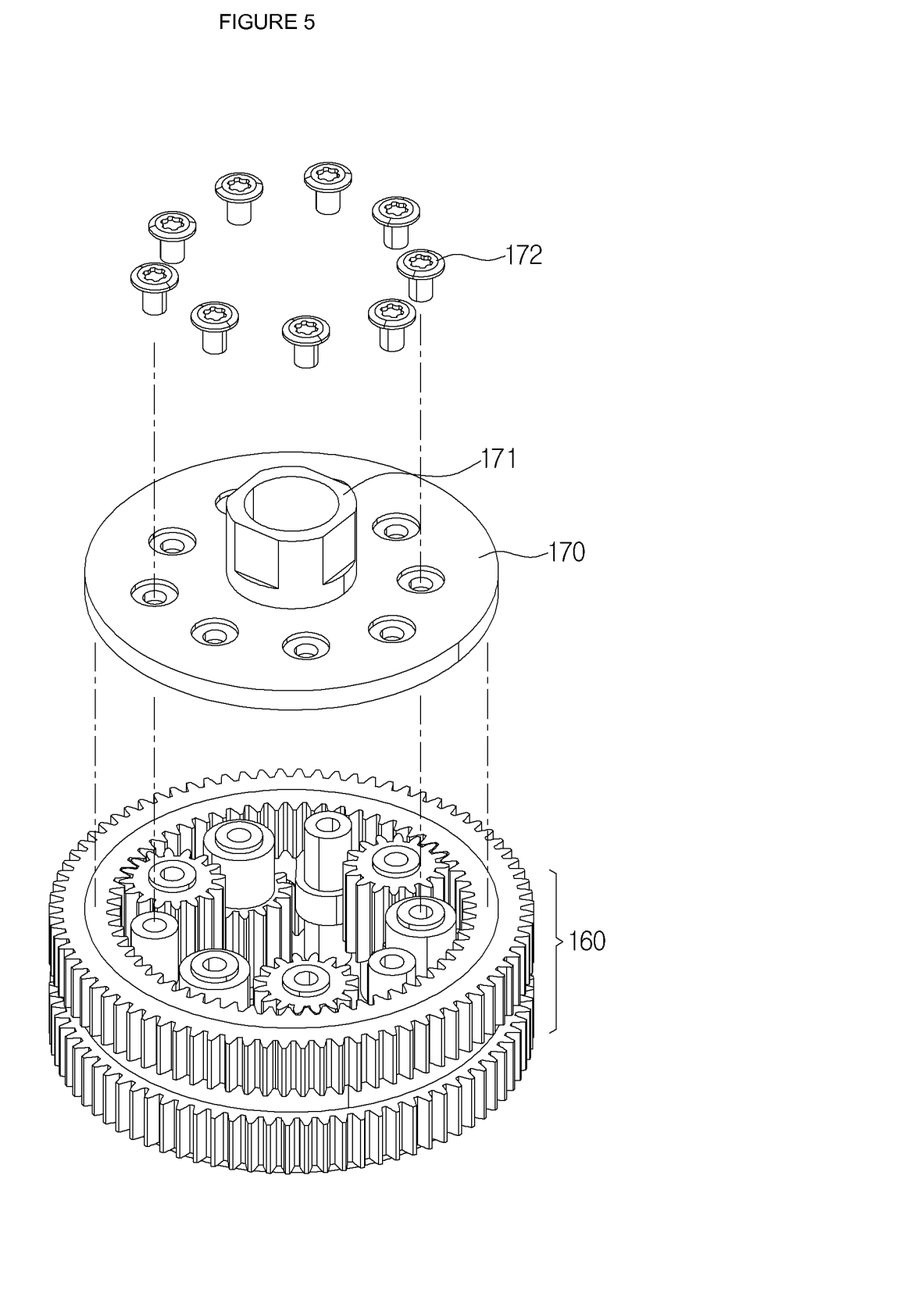
FIG. 5 is an exploded perspective view roughly illustrating a second differential gear in a multi-output differential gear apparatus of FIG. 1.
Figure 6:
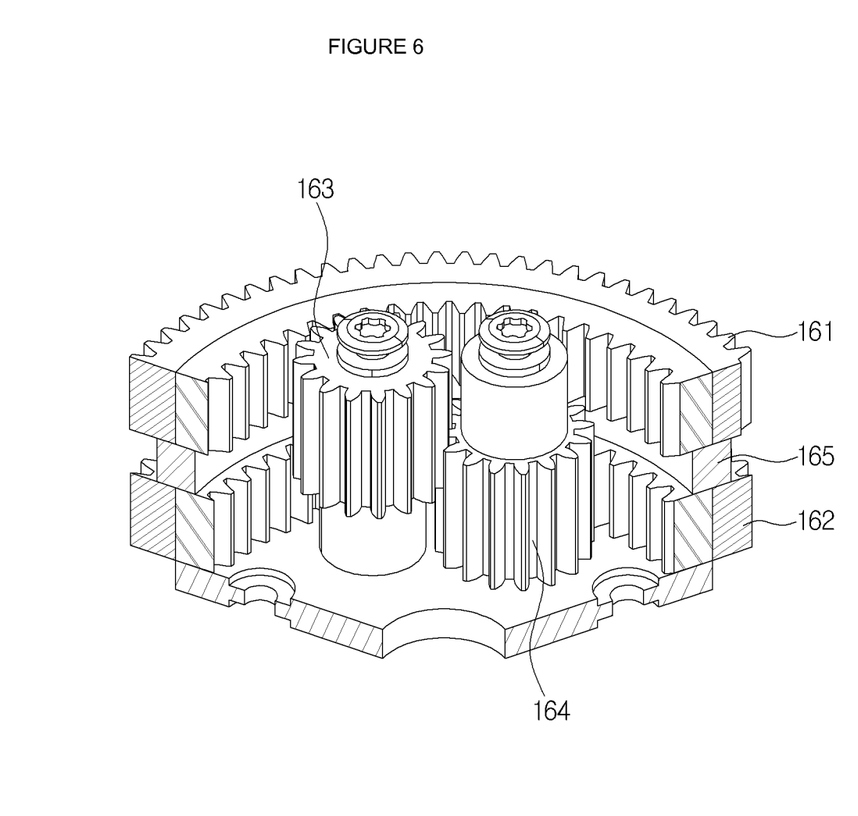
FIG. 6 is a perspective view roughly illustrating a combining relationship of a second gear in a second differential gear in a multi-output differential gear apparatus.

FIG. 1 is a perspective view roughly illustrating a multi-output differential gear apparatus in accordance with a first exemplary embodiment of the present disclosure, FIG. 2 is an exploded perspective view roughly illustrating a multi-output differential gear apparatus of FIG. 1, FIG. 3 is a front view roughly illustrating a first differential gear in a multi-output differential gear apparatus of FIG. 1, FIGS. 4A and 4B are cross-sectional views roughly illustrating how a guidance of a first differential gear combines with an epicyclic gear according to two different examples of the multi-output differential gear apparatus illustrated in FIG. 1, FIG. 5 is an exploded perspective view roughly illustrating a second differential gear in a multi-output differential gear apparatus of FIG. 1; and FIG. 6 is a perspective view roughly illustrating a combining relationship of a second gear in a second differential gear in a multi-output differential gear apparatus.

With reference to FIG. 1 or FIG. 2, a multi-output differential gear apparatus 100 according to a first exemplary embodiment of the present disclosure is an apparatus which may receive one input from outside and generate a plurality of outputs through a plurality of output gears, wherein differential gear motions may be generated by external resistance applied to each output gear that will be explained hereinbelow. A multi-output differential gear apparatus 100 according to a first exemplary embodiment of the present disclosure includes a first differential gear 110 and a second differential gear 150.

The first differential gear 110 receives external driving force, generates a first output having a different rotary speed from the external driving force when an external resistance is received, and interlocks and drives with the first output to transfer a middle output having a rotary speed reduced than that of the external driving force to a second differential gear 150. The first differential gear 110 includes a first gear 120, a first upper cover 130, and a first lower cover 140.

With reference to FIG. 3, the first gear 120 includes a first output gear 121, three first epicyclic gears 122 and middle gears 123; generates a first output having a different rotary speed from an external driving force at the same time as an external resistance is received, and generates a middle output having a reduced rotary speed in comparison to the external driving force. Herein, the reduced rotary speed volume differs depending on the gear ratio being engaged. In other words, when interlocked from the first output gear 121 to the middle gear 122, a first output that corresponds to the ratio of the number of gear saw teeth provided in an inner circumference of the first output gear 121 in comparison to the number of gear saw teeth of the middle gear 123 is transferred to the middle gear 123. This mathematical formula will be explained in greater detail in the operation of the first exemplary embodiment of the present disclosure described below.

The first output gear 121 has saw teeth in its inner circumference and outer circumference, the saw teeth of the inner circumference engage the first epicyclic gear 122, and the saw teeth of the outer circumference transfer the first output towards outside. That is, the saw teeth of the outer circumference interlock and drive with the external resistance at the same time as they receive the external resistance, to transfer the first output having a different rotary speed from the external driving force towards outside.

The first epicyclic gears 122 engage the inner circumference of the first output gear 121, three of them arranged around a central axis of the first differential gear 120 at 120° from one another. The first epicyclic gears 122 transfer the first output where the external resistance received from the first output gear 121 has been considered to the middle gear 123 that will be explained hereinbelow. However, the number or arrangement of the first epicyclic gears 122 is not limited to the present disclosure, but may be selected freely when necessary.

When there is no external resistance, the middle gear 123 does not rotate, whereas when external resistance is applied, the middle gear 123 interlocks with the first output gear 121 and transfers a middle output having a rotary speed reduced than that of the external driving force to the second differential gear 150.

Regarding the combining relationship of the first gear 120, the first epicyclic gears 122 engage the inner circumference of the first output gear 121, and the middle gear 123 that engages such first epicyclic gears 122 is arranged in such a manner to have the same central axis as the central axis of the multi-output differential gear apparatus. On the contrary, the first epicyclic gears 122 are arranged to engage along the outer circumference of the middle gear 123, and the first output gear 121 is arranged so that the saw teeth provided along the inner circumference engage with such first epicyclic gears 122. Herein, the first output gear 121 and middle gear 123 have the same central axis, which is identical to the central axis of the first differential gear 110.

With reference to FIG. 4A, the first upper cover 130 receives driving force from outside, and has a first guidance 131 for supporting the first epicyclic gears 122.

In order to receive external driving force, a spur gear which rotates in unity with the first upper cover around the same central axis as the first differential gear 110 may be combined to receive external driving force, but is not limited thereto, and thus it is also possible receive external driving force directly in the first upper cover 130.

Meanwhile, on a surface of the first upper cover 130 facing a lower cover 140 to be explained hereinbelow, a first guidance 131 is formed for fixating a position so that each of the first epicyclic gears 122 may rotate individually. When the first upper cover 130 receives external driving force and is rotated by such a guidance, the guidance makes the first epicyclic gears 122 make circular movements along a virtual concentric circle which connects the central axes of each of the first epicyclic gears. Such a guidance may be provided as but is not limited to a first fixed axle or a first protrusion so that the first epicyclic gears 122 may be inserted thereto.

When the first guidance 131 is formed as a first fixed axle, the length of the fixed axle must be longer than the thickness length of the first epicyclic gear so that it may be inserted into a first insertion groove of a lower cover 140 to be explained hereinbelow.

In addition, when the first guidance 131 is formed as a first protrusion, the first epicyclic gear 122 must be formed in consideration of a second protrusion being inserted into the lower cover that will be explained hereinbelow. That is, the length of the first protrusion and the second protrusion combined must be smaller than the thickness length of the first epicyclic gear 122. Herein, the protrusion may be formed using a nut or a pin, but is not limited thereto.

The first lower cover 140 combines with the first upper cover 130 and guides so that the gears of the first gear 120 may rotate in the determined positions, and also plays the role of a passage for transferring the middle output to the second differential gear 150. In order for the first lower cover 140 to play the role of a passage, a first penetration groove 142 is formed in a central portion for guiding so that a bond axle 171 extended from the second differential gear 150 that will be explained hereinbelow may combine with the middle gear 123.

Meanwhile, also on the first lower cover 140, there is provided a second guidance corresponding to the first guidance 131 of the first upper cover 130 on a surface facing the first upper cover 130 so that the first epicyclic gears 122 may rotate individually. However, the second guidance formed on the first lower cover 140 is embodied as either a first insertion groove 143 as illustrated in FIG. 4B or a second protrusion 141 as illustrated in FIG. 4A depending on the shape of the first guidance 131 formed on the first upper cover 130.

That is, when the first fixed axle is formed on the first upper cover 130, a first insertion groove where the first fixed axle in inserted is formed on the first lower cover 140, and when the first protrusion is formed on the first upper cover 130, a second protrusion corresponding to the first protrusion is formed on the first lower cover 140.

With reference to FIG. 5, the second differential gear 150 receives the middle output from the middle gear 123, and generates an output towards outside by the rotation of the second output gear 161 and the third output gear 162, as illustrated in FIG. 6. Furthermore, when an external resistance is received, the second differential gear 150 generates a second output having a different rotary speed from the middle output and a third output having a different rotary speed from the second output through the second output gear 161 and the third output gear 162. A multi-output differential gear apparatus 100 according to a first exemplary embodiment of the present disclosure includes a second gear 160, second upper cover 170, and second lower cover 180.

The second gear 160 includes the second output gear 161, third output gear 162, three second epicyclic gears 163, three epicyclic gears 164, and a panel bearing 165. When there is no external resistance, the second gear 160 generates a same output as the middle output through the second output gear 161 and the third output gear 162; and when external resistance is received from the second output gear 161 or the third output gear 162, the second gear 160 generates a second output having a different rotary speed from the middle output through the second output gear 161, and interlocks the second output gear 161 to generate a third output differentiated from the second output through the third output gear 162.

In addition, in a case where there is no middle output, when external resistance is applied towards the second output gear 161, the external resistance is applied by the interlocked driving of the second output gear 161, second epicyclic gear 163, and third epicyclic 164, rotating the third output gear 162 in the direction opposite to the direction of rotation of the second output gear 161.

The second output gear 161 has saw teeth in its inner and outer circumference, the saw teeth of the inner circumference engaging the second epicyclic gear 163, and the saw teeth of the outer circumference transferring the second output towards outside. That is, the saw teeth of the outer circumference interlocks and drives with external resistance at the same time as it receives the external resistance, transferring the second output having a different rotary speed from the middle output towards outside.

The third output gear 162 has saw teeth in its inner circumference and outer circumference, the saw teeth of the inner circumference engaging the third epicyclic gear 164, and the saw teeth of the outer circumference transferring the third output towards outside. That is, the saw teeth of the outer circumference interlocks and drives with external resistance at the same time as it receives the external resistance, transferring the third output having a different rotary speed from the external driving force towards outside.

With reference to FIG. 6, three second epicyclic gears 163 are arranged at 120° from one another around a central axis of the second differential gear 150, each second epicyclic gear 163 engaging an inner circumference of the second output gear 161 and a third epicyclic gear 164. A second epicyclic gear 163 transfer external resistance received from the second output gear 161 to a third epicyclic gear 164 to be explained hereinbelow. However, the number and arrangement of a second epicyclic gear 163 is not limited to the present disclosure, but may be selected freely when necessary.

Three third epicyclic gears 164 are arranged at 120° from one another around a central axis of the second differential gear 150, each third epicyclic gear 164 engaging an inner circumference of the third output gear 162 and the second epicyclic gear 163. Meanwhile, the number and arrangement of a third epicyclic gear 163 is not limited to the present disclosure, but may be selected freely when necessary.

The panel bearing 165 is provided between the second output gear 162 and the third output gear 163, preventing the second output gear 162 and third output gear 163 from contacting each other during rotation and thus being worn out. In order to fixate the position of the panel bearing, a penetration hole may be formed in the guidance provided in a second upper cover and a second lower cover 180 to be explained hereinbelow, but is not limited thereto.

Regarding the combining relationship of the second gear 160, the second epicyclic gears 163 engage the inner circumference of the second output gear 161 and each of the third epicyclic gears 164. In addition, the third epicyclic gears 164 engage the inner circumference of the third output gear 162. However, since only a part of the second epicyclic gear 163 engage a part of the third epicyclic gear 164, the second epicyclic gear 163 does not engage the third output gear 162 nor does the third epicyclic gear 164 engage the second output gear 161 directly.

In addition, the second output gear 161 and the third output gear 162 are arranged adjacently to each other around the central axis of the second differential gear 150, and the panel bearing 165 is arranged between the second output gear 161 and the third output gear 162, preventing the second output gear 161 and the third output gear 162 contacting each other during rotation. The second output gear 161 and the third output gear 162 are arranged to have the same central axis as the multi-output differential gear apparatus 100.

On a surface of the second upper cover facing the second lower cover 180 to be explained hereinbelow, a third guidance 172 is formed so that the second epicyclical gears 163 and third epicyclic gears 164 may rotate at their fixed positions. This third guidance 172 may be embodied as a second fixed axis or third protrusion so that the second epicyclical gears 163 and third epicyclic gears 164 may be inserted, but is not limited thereto.

When the third guidance 172 is embodied as a second fixed axis, the length of the second fixed axis must be longer than the thickness length of the second epicyclic gear or the third epicyclic gear 164 so that it may be inserted into a second insertion groove of a lower cover 180 to be explained hereinbelow. Furthermore, when the third guidance 172 is embodied as a third protrusion, the second epicyclic gear 163 and the third epicyclic gear 164 being inserted into the fourth protrusion must be considered. That is, the length of the third protrusion and the fourth protrusion combined must be smaller than the thickness length of the second epicyclic gear 163 or the third epicyclic gear 164.

The second lower cover 180 combines with the second upper cover 170 to guide the gears of the second gear 160 to rotate at their fixed positions. On a surface facing the second upper cover 170, fourth guidances 181 corresponding to the third guidance 172 formed on the second upper cover 170 are formed so that the second epicyclic gears 163 and the third epicyclic gears 164 rotate at their fixed positions. However, the fourth guidances 181 formed on the second lower cover 180 are embodied as second insertion grooves or fourth protrusions according to the shape of the third guidance 172 formed on the second upper cover 170.

The corresponding relationship between the third guidances 172 and the fourth guidances 181 is the same as the relationship between the first guidances 131 and the second guidances 141, and thus detailed explanation is omitted.

Hereinbelow is an explanation on an operational method of each configurative element in a first exemplary embodiment of the aforementioned multi-output differential gear apparatus in cases where external resistance is applied, followed by an explanation on the overall operation of the multi-output differential gear apparatus.

Hereinbelow is an explanation on the operation of the first differential gear 110. First, when external resistance is not applied to the first output gear 121 side, the first upper cover 130 and first lower cover 140 are rotated by the external driving force, and the first epicyclic gear 122 is rotated by the guidance along the outer circumference of the middle gear 123. Herein, the middle gear 123 maintains its static state, while the first output gear 121 rotates in the same rotation direction as the external driving force, and the rotation speed changes according to the ratio of the number of gear saws of the first output gear 121 to the number of gear saws of the first epicyclic gear 122.

That is, in this case, since the middle gear 123 is at a static state, the middle output also becomes 0, and the second differential gear 150 also falls into a static state if no external resistance is received.

However, when external resistance is applied to the first output gear 121 side, the first output gear 121 generates a first output different from the rotation speed of the external driving force by the external resistance, and the gears of the first gear 120 interlock one another to generate the middle output in the middle gear 123. By this, the middle gear 123 performs the function of differential motion regarding the external driving force.

Meanwhile, hereinbelow is an explanation on the operation method of the second differential gear 150. If the middle output transferred to the second differential gear 150 is 0, the second output and third output by the second output gear 161 and third output gear 162 are affected by whether or not external resistance is received. When no external resistance is received, as aforementioned, neither the second output nor the third output will be generated, but when external resistance is applied towards the second output gear 161 or the third output gear 162, the second output gear 161 and the third output gear 162 interlock and rotate with each other, generating the second output and the third output.

Herein, when the middle output is applied to the second differential gear 150 and the external resistance is applied towards the second output gear 161, the second output gear 161 generates a second output having a different rotary speed from the middle output, and the third output gear 162 interlocked with the second output gear 161 generates a third output having a different rotary speed from the second output.

On the contrary, even when external resistance is applied towards the third output gear 162, the same operation is performed as the aforementioned case where external resistance is applied towards the second output gear, and when external resistance is applied towards both the second output gear 161 and the third output gear 162, it is regarded that the external resistance is applied towards where the greater external resistance is applied, and thus operates as aforementioned. That is, the second output gear 161 and the third output gear 162 both perform the differential motion function.

Hereinbelow is an overall operation method of a multi-output differential gear apparatus 100 according to a first exemplary embodiment of the present disclosure. When external driving force is not applied, the rotation speed differs according to the number of gear saw teeth, but the rotation is made in the same direction.

Meanwhile, if all the three output gears have to rotate in the same direction and speed, the relative speed of the gears would be 0, but if the three output gears have to rotate at different speed, in other words, if the output gears perform the differential motion function, the relative speed of each output gear would differ from one another. This may be explained in the following mathematical formula:

$$\begin{bmatrix} \omega_1 \\ \omega_{4/1} \\ \omega_{6/4} \end{bmatrix} = \begin{bmatrix} 1 & \left(\frac{n_3}{n_2}\right)\left(-\frac{n_4}{n_3}\right) & 0 \\ 1 & 1 & \frac{n_6}{n_5} \\ 1 & 1 & -\left(\frac{n_6}{n_8}\right) \end{bmatrix}^{-1} \begin{bmatrix} \omega_2 \\ \omega_5 \\ \omega_8 \end{bmatrix}$$

Herein, $\omega_1$ indicates the rotary speed of external driving force, $\omega_2$ the rotary speed of the first output gear, $\omega_5$ the rotary speed of the second output gear, $\omega_8$ the rotary speed of the third output gear, $\omega_{4/1}$ the relative speed of the middle gear regarding external driving force, and $\omega_{6/4}$ the relative speed of the second epicyclic gear regarding the middle gear. In addition, $n_3$ indicates the number of gear saw teeth of the first epicyclic gear, $n_2$ the number of gear saw teeth of the first output gear, $n_4$ the number of gear saw teeth of the middle gear, and $n_3$ the number of gear saw teeth of the first epicyclic gear. Furthermore, $n_6$ indicates the number of gear saw teeth of the second epicyclic gear, $n_5$ the number of gear saw teeth of the second output gear, $n_7$ the number of gear saw teeth of the third epicyclic gear, and $n_8$ the number of gear saw teeth of the third output gear.

Figure 7:
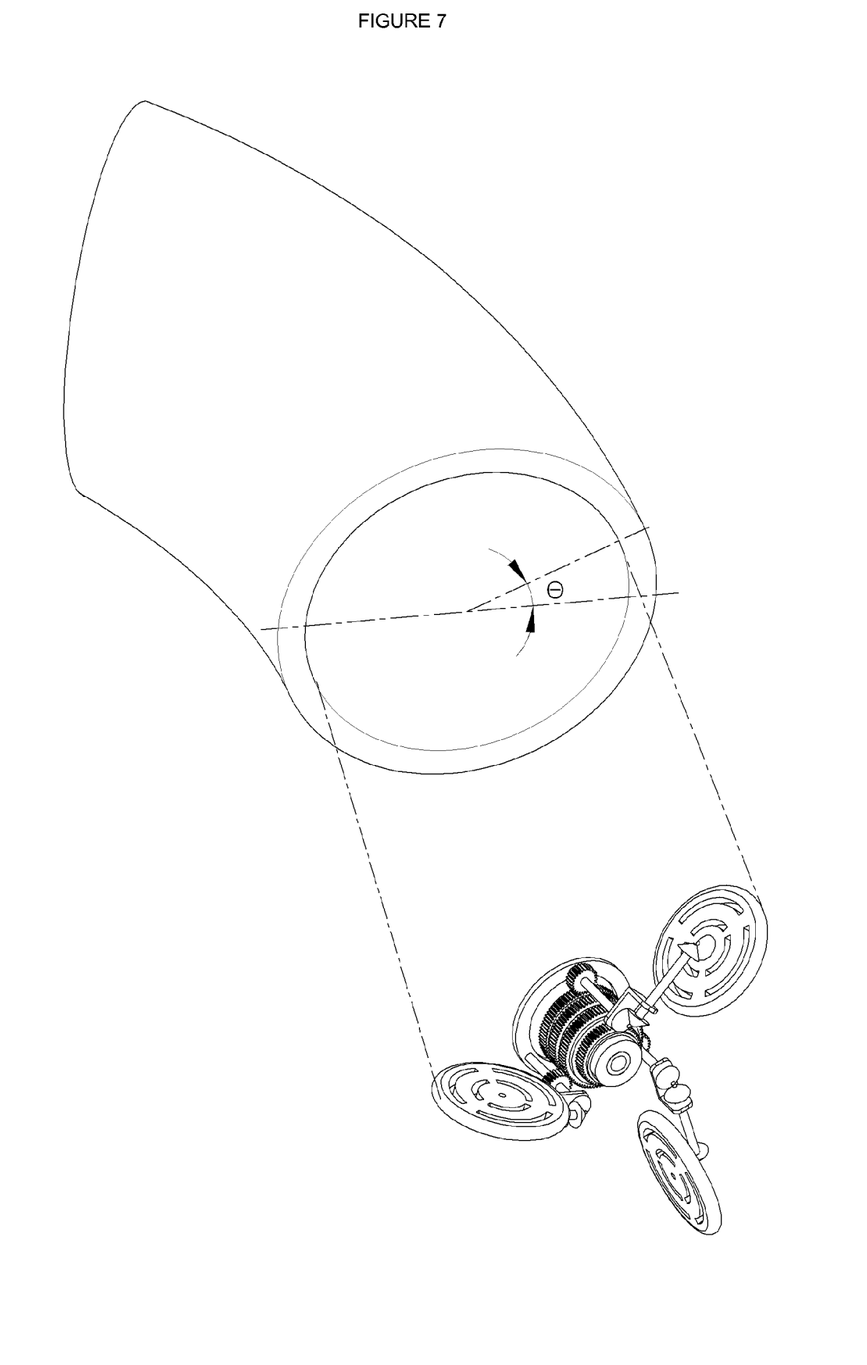
FIG. 7 is a view illustrating a testing environment for understanding a speed relationship of each output gear in a multi-output differential gear apparatus of FIG. 1.
Figure 8:
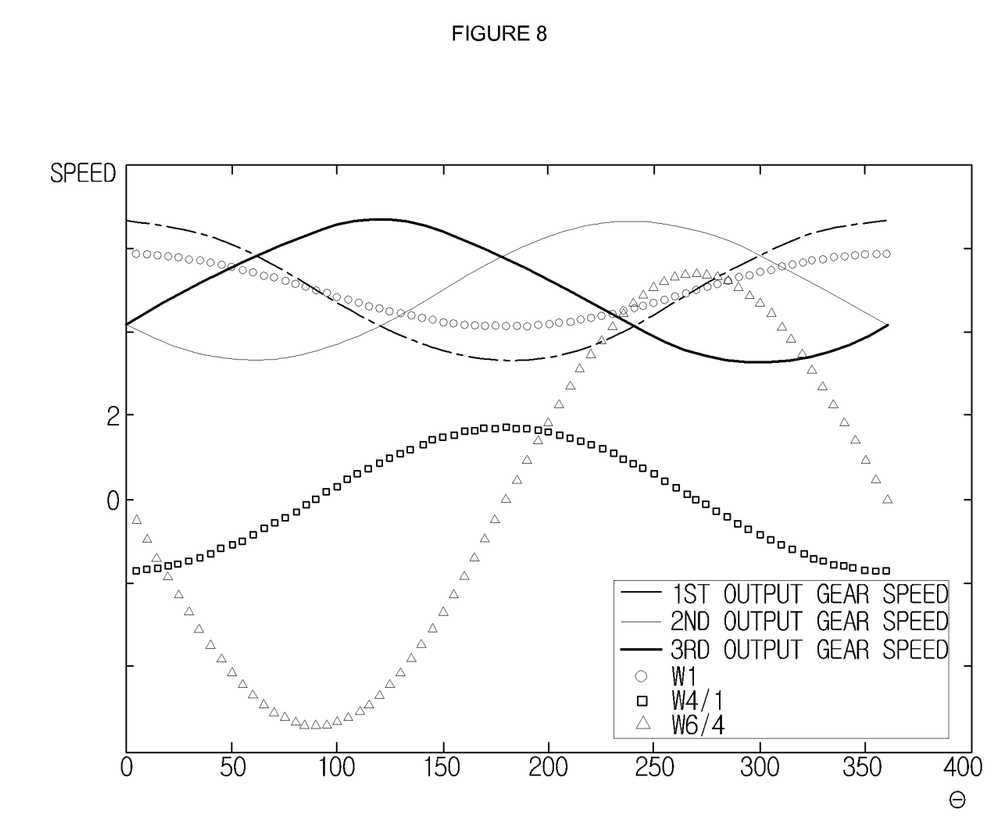
FIG. 8 is a graph roughly illustrating a result of testing in a testing environment of FIG. 7.

FIG. 7 is a view illustrating a testing environment for understanding a speed relationship of each output gear in a multi-output differential gear apparatus of FIG. 1, and FIG. 8 is a graph roughly illustrating a result of testing in a testing environment of FIG. 7.

With reference to FIG. 7, in a multi-output differential gear apparatus according to a first exemplary embodiment of the present disclosure, the testing environment for understanding a speed relationship of each output gear is an elbow pipe having a radius of curvature of 1.5 D and a diameter of 6 inches. If each of three wheels arranged at 120° from each other is connected to the output gear and is operated, the rotary speed of the three wheels must be different from one another. The speed of each wheel has a dependent relationship on the rotary speed of the output gears, and changing the angle θ between the wheel connected to the first output gear and the most exterior of the pipe from 0°~360° provides the results illustrated in FIG. 8.

According to FIG. 8, the speed of the first output gear ($w_2$), the speed of the second output gear ($\omega_5$), and the speed of the third output gear ($\omega_8$) are expressed in lines, whereas regarding the rotary speed of external driving force ($S_1$), the relative speed of the middle gear to the external driving force ($S_{4/1}$), and the relative speeds of the second epicyclic gears to the middle gear ($S_{6/4}$), each moment is expressed in dots sequentially connected to one another. Accordingly, it can be seen that differential motion is made as the relative speeds of the internal gears differ from one another.

Next, hereinbelow is an explanation on a multi-output differential gear apparatus 200 according to a second exemplary embodiment of the present disclosure.

Figure 9:
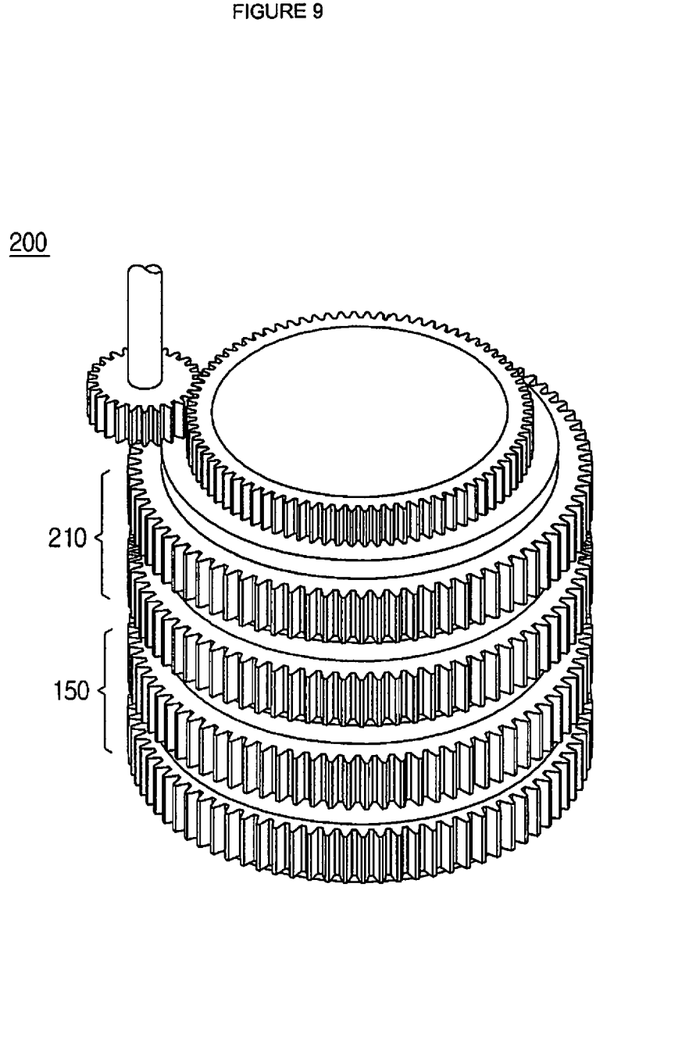
FIG. 9 is a perspective view roughly illustrating a multi-output differential gear apparatus according to a second exemplary embodiment of the present disclosure.
Figure 10:
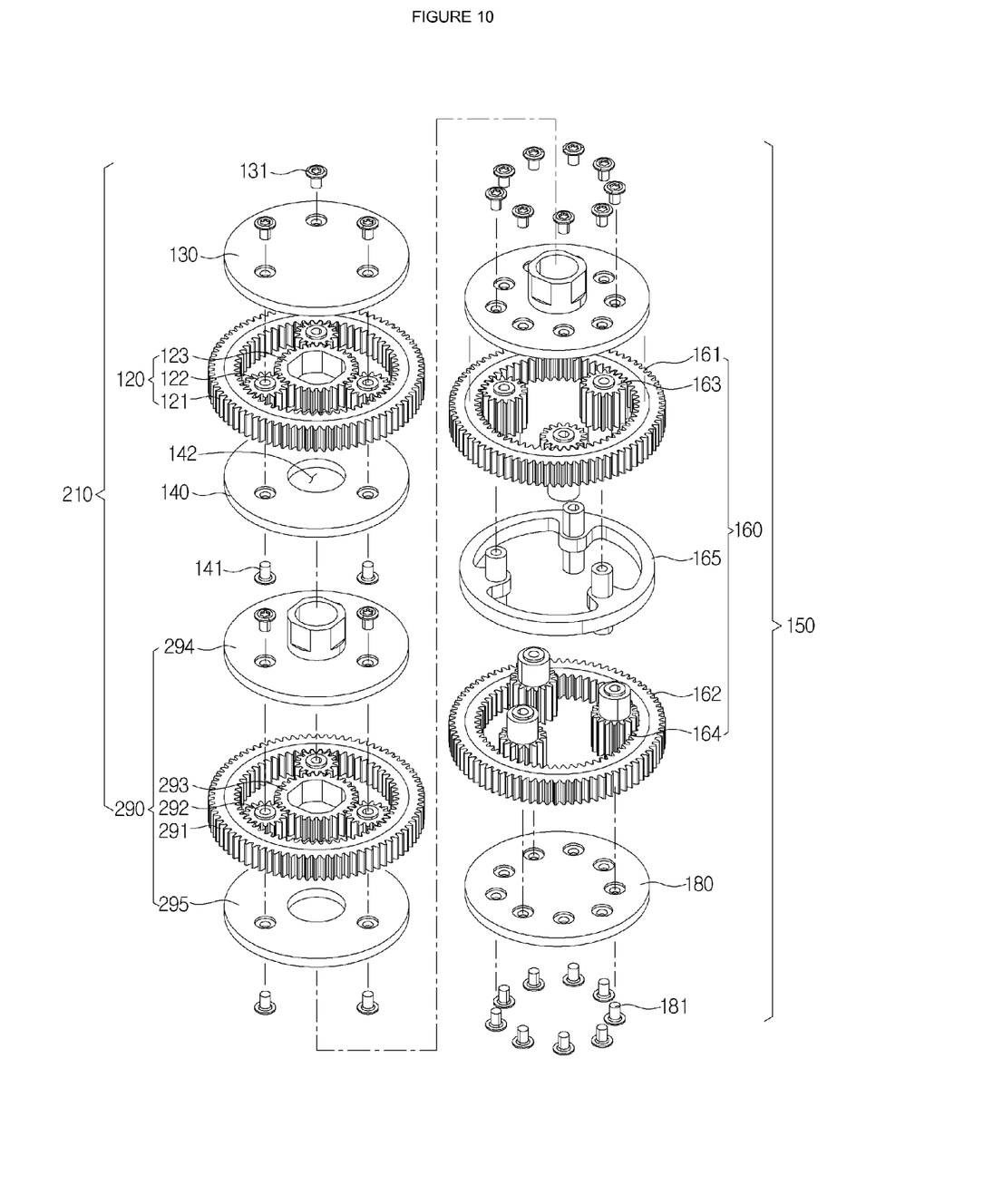
FIG. 10 is an exploded perspective view roughly illustrating a multi-output differential gear apparatus of FIG. 9.

FIG. 9 is a perspective view roughly illustrating a multi-output differential gear apparatus according to a second exemplary embodiment of the present disclosure, and FIG. 10 is an exploded perspective view roughly illustrating a multi-output differential gear apparatus of FIG. 9.

With reference to FIG. 9 or FIG. 10, a multi-output differential gear apparatus 200 according to a second exemplary embodiment of the present disclosure includes a first differential gear 210 and a second differential gear 150 having a same central axis.

The first differential gear 210 includes a first gear 220, a first upper cover 230, a first lower cover 240, and a fourth output gear 290; and the first gear 220, the first upper cover 230, and the first lower cover 240 are the same as in the first exemplary embodiment of the present disclosure, and thus detailed explanation is omitted.

The fourth output gear 290 includes a fourth output gear 291, a fourth epicyclic gear 292, a second middle gear 293, a third upper cover 294, and a third lower cover 295. When the fourth output gear 290 receives the middle output from the middle gear 223 and receives external resistance from the fourth output gear 291, it generates the second middle output towards the second middle gear 293 which interlocks and drives with the fourth output gear 291. The second middle output is transferred to the bond axle 171 extended from the second upper cover 170 of the second differential gear 150 provided to combine with the second middle gear 293.

The combining relationship of the fourth output gear 290 is the same as that of the first differential gear 210, and thus detailed explanation is omitted. However, regarding the combining relationship of the fourth output gear 290 in the first differential gear 210, the first lower cover 240 and the third upper cover 294 of the fourth output gear 290 are arranged to be adjacent to each other along the central axis of the first differential gear 210, and the axis extended from the third upper cover 294 of the fourth output gear 290 combines with the middle gear 223 of the first differential gear 210, receiving the middle output.

In addition, the second middle gear 293 of the fourth output gear 290 combines with the bond axle 171 of the second differential gear 150 and transfers the second middle output to the second differential gear 150.

That is, one surface of the fourth output gear 290 combines with the first lower cover 240 of the first differential gear 210 and the other surface combines with the second upper cover 170 of the second differential gear 150 along the central axis of the multi-output differential gear 200 according to the second exemplary embodiment of the present disclosure.

Hereinbelow is detailed explanation on the operation of the second exemplary embodiment 200 of the aforementioned multi-output differential gear apparatus.

The operation method of the second differential gear 250 is the same as the first exemplary embodiment of the present disclosure, and thus detailed explanation is omitted.

First, when the middle output is generated from the middle gear 223, the middle output is transferred to the axis of the third upper cover 294 of the fourth output gear 290 which combines with the middle gear 223. Due to the middle output transferred to the third upper cover 294, the fourth output gear 290 starts to operate, which is the same as the operation of each gear of the first gear 120 in the first exemplary embodiment of the present disclosure, and thus detailed explanation is omitted.

When external resistance is applied to the fourth output gear 291, and a second middle output is generated from the second middle gear 293, such a second middle output is transferred to the second upper cover 170 of the second differential gear 150, operating the second differential gear 150. The following operations of the second differential gear 150 are the same as the operations in the first exemplary embodiment, and thus detailed explanation is omitted.

According to the multi-output differential gear apparatus 200 of the second exemplary embodiment of the present disclosure, it is possible to generate four outputs towards the four output gears with just one external driving force. This may be applied to a four-wheel drive automobile, and it is possible to obtain the effect of differential motions in all four wheels of the four-wheel drive automobile, but this is not limited thereto.

In addition, the first differential gear 210 may further include a fifth output gear, a sixth output gear etc., that is, a plurality of output gears, thereby generating the number of outputs that a user wants from just one external driving force.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

DETAILED DESCRIPTION

100: MULTI-OUTPUT DIFFERENTIAL GEAR APPARATUS
110: FIRST DIFFERENTIAL GEAR
120: FIRST GEAR
130: FIRST UPPER COVER
140: FIRST LOWER COVER
150: SECOND DIFFERENTIAL GEAR
160: SECOND GEAR
170: SECOND UPPER COVER
180: SECOND LOWER COVER
200: MULTI-OUTPUT DIFFERENTIAL GEAR APPARATUS
210: FIRST DIFFERENTIAL GEAR
290: FOURTH OUTPUT GEAR
291: FOURTH OUTPUT GEAR
292: FOURTH EPICYCLIC GEAR
293: SECOND MIDDLE GEAR
294: THIRD UPPER COVER
295: THIRD LOWER COVER

What is claimed is:

1. A multi-output differential gear apparatus comprising:
a first differential gear set comprising a first output gear configured to receive an external driving force, a plurality of first epicyclic gears configured to engage the first output gear, and a middle gear disposed between the plurality of first epicyclic gears and configured to interlock with the plurality of first epicyclic gears to generate a middle output, the first differential gear set being configured to generate the middle output having a different rotary speed from the external driving force; and
a second differential gear set configured to directly receive the middle output through direct connection with the middle gear, and comprising gearing comprising each of a second output gear configured to receive the middle output from the first differential gear set through operative connection with the first differential gear set and a third output gear, portions of the gearing of the second differential gear set being operatively connected with the second and third output gears and configured to generate a third output having a different rotary speed from a second output, the second differential gear set being configured to generate the second output having a different rotary speed from the middle output,
wherein the first differential gear set and the second differential gear set are joined so as to be rotatable about a same central axis passing through the middle gear,
wherein the gearing of the second differential gear set further comprises
a plurality of second epicyclic gears configured to engage and rotate the second output gear, and
a plurality of third epicyclic gears configured to simultaneously engage and rotate the second epicyclic gears and the third output gear, and
wherein an inner circumference of the second output gear and an inner circumference of the third output gear comprise saw teeth.

2. The multi-output differential gear apparatus according to claim 1,
wherein the first output gear comprises an inner circumference having saw teeth,
the middle gear is provided inside of and distanced from the first output gear, and
the plurality of first epicyclic gears is configured to simultaneously engage the inner circumference of the first output gear and an outer circumference of the middle gear.

3. The multi-output differential gear apparatus according to claim 2,
wherein the plurality of first epicyclic gears comprises three first epicyclic gears that are arranged at equal angles around a central axis of the first differential gear set.

4. The multi-output differential gear apparatus according to claim 2,
wherein the first differential gear set further comprises a first upper cover having first fixed axles disposed on a surface facing the first output gear so that the first fixed axles are inserted into the plurality of first epicyclic gears, respectively, so that the plurality of first epicyclic gears are allowed to rotate individually; and a first lower cover having a first penetration groove in a central portion of the first lower cover that is penetrated by a bond axle that is extended from the second differential gear set and bonds with the middle gear, and having first insertion grooves on a surface facing the first upper cover so that the first fixed axles are inserted in the first insertion grooves, respectively.

5. The multi-output differential gear apparatus according to claim 2,
wherein the first differential gear set further comprises a first upper cover having first protrusions on a surface facing the first output gear so that the first protrusions are inserted into the plurality of first epicyclic gears, respectively, to allow each of the plurality of first epicyclic gears to rotate individually; and a first lower cover having a first penetration groove in a central portion of the first lower cover that is penetrated by a bond axle that is extended from the second differential gear set and bonds with the middle gear, and having second protrusions on a surface facing the first upper cover to correspond to the first protrusions.

6. The multi-output differential gear apparatus according to claim 1,
wherein the plurality of second epicyclic gears comprises three gears arranged at equal angles around a central axis of the second differential gear set, and the plurality of third epicyclic gears comprise three gears arranged at equal angles around the central axis of the second differential gear set.

7. The multi-output differential gear apparatus according to claim 1,
wherein the second differential gear set further comprises a second upper cover configured to receive the middle output from the middle gear, the second upper cover having second fixed axles disposed on a surface facing the second output gear so that the second fixed axles are inserted in the plurality of second epicyclic gears and the plurality of third epicyclic gears, respectively, to allow the plurality of second epicyclic gears and the plurality of third epicyclic gears to rotate individually; and a second lower cover having second insertion grooves on a surface facing the second upper cover so that the second fixed axles are inserted in the second insertion grooves, respectively.

8. The multi-output differential gear apparatus according to claim 1,
wherein the second differential gear set further comprises a second upper cover configured to receive the middle output from the first differential gear set, and a second lower cover,
the second upper cover having third protrusions so that the third protrusions are inserted into the plurality of second epicyclic gears and the plurality of third epicyclic gears, respectively, to allow the plurality of second epicyclic gears and the plurality of third epicyclic gears to rotate individually; and the second lower cover having fourth protrusions on a surface facing the second upper cover to correspond to the third protrusions.

9. The multi-output differential gear apparatus according to claim 1,
wherein the second differential gear set further comprises a panel bearing between the second output gear and the third output gear to prevent the second output gear and third output gear from contacting each other.

10. The multi-output differential gear apparatus according to claim 1,
wherein the first output gear, second output gear or third output gear has an external circumference and saw teeth in the external circumference.

11. The multi-output differential gear apparatus according to claim 1,
wherein the first differential gear further comprises a fourth output gear configured to generate a fourth output, and
the fourth output has a different rotary speed from a first output of the first output gear.

* * * * *